United States Patent
Kawa et al.

(10) Patent No.: US 10,360,330 B2
(45) Date of Patent: Jul. 23, 2019

(54) EVALUATION OF VOLTAGE DOMAINS IN THE PRESENCE OF LEAKAGE AND/OR DYNAMIC SWITCHING

(71) Applicant: Synopsys, Inc., Mountain View, CA (US)

(72) Inventors: Jamil Kawa, Campbell, CA (US); Thu Nguyen, Palo Alto, CA (US)

(73) Assignee: Synopsys, Inc., Mountain View, CA (US)

( * ) Notice: Subject to any disclaimer, the term of this patent is extended or adjusted under 35 U.S.C. 154(b) by 167 days.

(21) Appl. No.: 15/232,411

(22) Filed: Aug. 9, 2016

(65) Prior Publication Data

US 2017/0045557 A1 Feb. 16, 2017

Related U.S. Application Data

(60) Provisional application No. 62/203,369, filed on Aug. 10, 2015.

(51) Int. Cl.
*G06F 17/50* (2006.01)

(52) U.S. Cl.
CPC ...... *G06F 17/5036* (2013.01); *G06F 2217/78* (2013.01)

(58) Field of Classification Search
CPC ............ G06F 17/5036; G06F 2217/78; G01R 15/146; G01R 31/025; G01R 31/02
See application file for complete search history.

(56) References Cited

U.S. PATENT DOCUMENTS

| | | | |
|---|---|---|---|
| 7,193,427 B2 | 3/2007 | Persun et al. | |
| 7,739,629 B2* | 6/2010 | Wang | G06F 17/505 703/14 |
| 7,898,278 B2* | 3/2011 | Flynn | H02M 3/156 324/764.01 |
| 8,020,138 B2* | 9/2011 | Balch | G01R 31/2884 716/133 |
| 8,051,399 B2* | 11/2011 | Vishweshwara | G06F 17/5031 716/108 |
| 8,453,086 B2* | 5/2013 | Tung | G06F 17/5022 716/109 |
| 8,516,422 B1* | 8/2013 | Wang | G06F 17/505 703/16 |
| RE44,479 E * | 9/2013 | Wang | G06F 17/505 703/14 |
| 8,839,165 B2* | 9/2014 | Bickford | G06F 17/5036 703/13 |
| 8,839,170 B2* | 9/2014 | Bickford | G06F 17/5045 716/113 |

(Continued)

OTHER PUBLICATIONS

Nigam et al., An efficient approach to evaluate Dynamic and Static voltage-drop on a multi-million transistor SoC design, STMicroelectronics, Copyright 2018—Design-Reuse.com.*

(Continued)

*Primary Examiner* — Patrick Assouad
*Assistant Examiner* — Sean Curtis
(74) *Attorney, Agent, or Firm* — HIPLegal LLP; Judith Szepesi

(57) ABSTRACT

An automated circuitry that can co-exist in any chip and that allows for a accurate characterization of I*R drops at a block and/or whole chip level is described.

22 Claims, 5 Drawing Sheets

(56) References Cited

U.S. PATENT DOCUMENTS

| | | | |
|---|---|---|---|
| 2003/0117179 A1* | 6/2003 | Hsu | H03K 19/0963 326/98 |
| 2003/0212538 A1* | 11/2003 | Lin | G06F 17/5022 703/14 |
| 2005/0257077 A1* | 11/2005 | Dutta | G01R 31/3004 713/340 |
| 2005/0288899 A1* | 12/2005 | Winstead | G01R 31/2837 702/183 |
| 2007/0245285 A1* | 10/2007 | Wang | G06F 17/505 716/104 |
| 2009/0115258 A1* | 5/2009 | Flynn | H02M 3/156 307/129 |
| 2009/0295402 A1* | 12/2009 | Balch | G01R 31/2884 324/537 |
| 2013/0326459 A1* | 12/2013 | Bickford | G06F 17/5045 716/133 |
| 2014/0215429 A1* | 7/2014 | Bickford | G06F 17/5036 716/136 |
| 2015/0213179 A1* | 7/2015 | Dangat | G06F 17/5068 716/111 |
| 2016/0139477 A1* | 5/2016 | Jack | G09G 3/19 359/275 |
| 2017/0024003 A1* | 1/2017 | Kawa | G06F 1/3296 |
| 2017/0045557 A1* | 2/2017 | Kawa | G06F 17/5036 |

OTHER PUBLICATIONS

Synopsys, PrimeRail: In-Design Rail Analysis for Place-and-Route Engineers (datasheet), Copyright 2009, Synopsys, Inc.*

Nigam et al., An efficient approach to evaluate Dynamic and Static voltage-drop on a multi-million transistor SoC design, STMicroelectronics, Copyright 2018—Design-Reuse.com (Year: 2018).*

Synopsys, PrimeRail: In-Design Rail Analysis for Place-and-Route Engineers (datasheet), Copyright 2009, Synopsys, Inc. (Year: 2009).*

Carelabs, What Is Voltage Drop Study and Analysis. www.carelabz.com (Year: 2019).*

Nigam et al. An Efficient Approach to evaluate Dynamic and Static Voltage-drop on a multi-million transistor SoC design. https://www.design-reuse.com/articles/32852/dynamic-and-static-voltage-drop-evaluation.html Sep. 2013 (Year: 2013).*

RedHawk(TM)-CPA Chip-Package Co-Analysis, Presentation from Design Automation Conference (2014). (17 pages).

* cited by examiner

EVALUATION OF VOLTAGE DOMAINS IN THE PRESENCE OF LEAKAGE AND/OR DYNAMIC SWITCHING

RELATED APPLICATIONS

The present applications claims priority to U.S. Provisional Application No. 62/203,369, filed on Aug. 10, 2015, and incorporates that application by reference in its entirety.

FIELD

The present invention relates to evaluating voltage at various points in a power network, and more particularly to evaluating voltage domains in the presence of leakage and/or dynamic switching.

BACKGROUND

An advanced electronic design (chip) can have in excess of 40 blocks operating at different voltages referred to as voltage domains. Some voltage domains are completely independent of each other powered by independent supplies due to different standards or specifications, other voltage domains are powered by the same power source but the effective voltage reaching each domain is different due to voltage drop across the power delivery network caused by leakage during the idle state of one block or due to the dynamic power requirements of such a block during functional operation. Chip and system designers depend on EDA tools to estimate the effective voltage reaching each block as it has direct consequence on the operating speed of such a block.

One such power evaluation tool is PrimeRail® by SYNOPSYS®. PrimeRail® extracts the physical layout implementation of the power network of a chip and a mathematical abstraction (model) of the circuitry associated with it. It constructs an RC (resistance and capacitance) realization of the power network, and uses the current and voltage models of the associated circuitry driven by the power network to arrive at an estimation of the voltage drop (I*R drop) for each trunk or mesh starting at the power source and arriving at a block or at a particular point within a block. The voltage domain values for various blocks are then used in other EDA tools such as PrimeTime® by SYNPSYS® for timing closure analysis.

Such a power network analysis is subject to mathematical simplifications for compactness and efficiency as well as to the consideration of the process corners and to the accuracy of the current and voltage models of the powered circuitry in each block.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

The system, in one embodiment, physically derives an accurate evaluation of voltages applied to various voltage domains under idle conditions (dominated by leakage) and under dynamic active switching conditions. The system provides an automated characterization of leakage, static and dynamic I*R drop across multi-voltage domains, and blocks in a system on a chip (SOC). The results from this scheme can be used for calibrating power domain analysis models and tools such as PrimeRail. The results may also be used for compensating for I*R drop at certain blocks through various means including but not limited to adjusting the original supply voltage, adjusting the speed of the clock going to such a block, or other on-chip voltage compensation techniques.

Leakage is a critical metric because in current advanced chips there are as many as 4 to 6 billion transistors, so if each transistor leaks 1 nA then a billion transistors leak one amp, and even at just 10 pA per transistor, the uncontrolled leakage of 3 Billion transistors is 30 mA. That level of leakage is significant, and becoming more so as the voltage provided to circuits is further reduced. Furthermore, leakage can have a statistically significant distribution due to lithographic effects.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
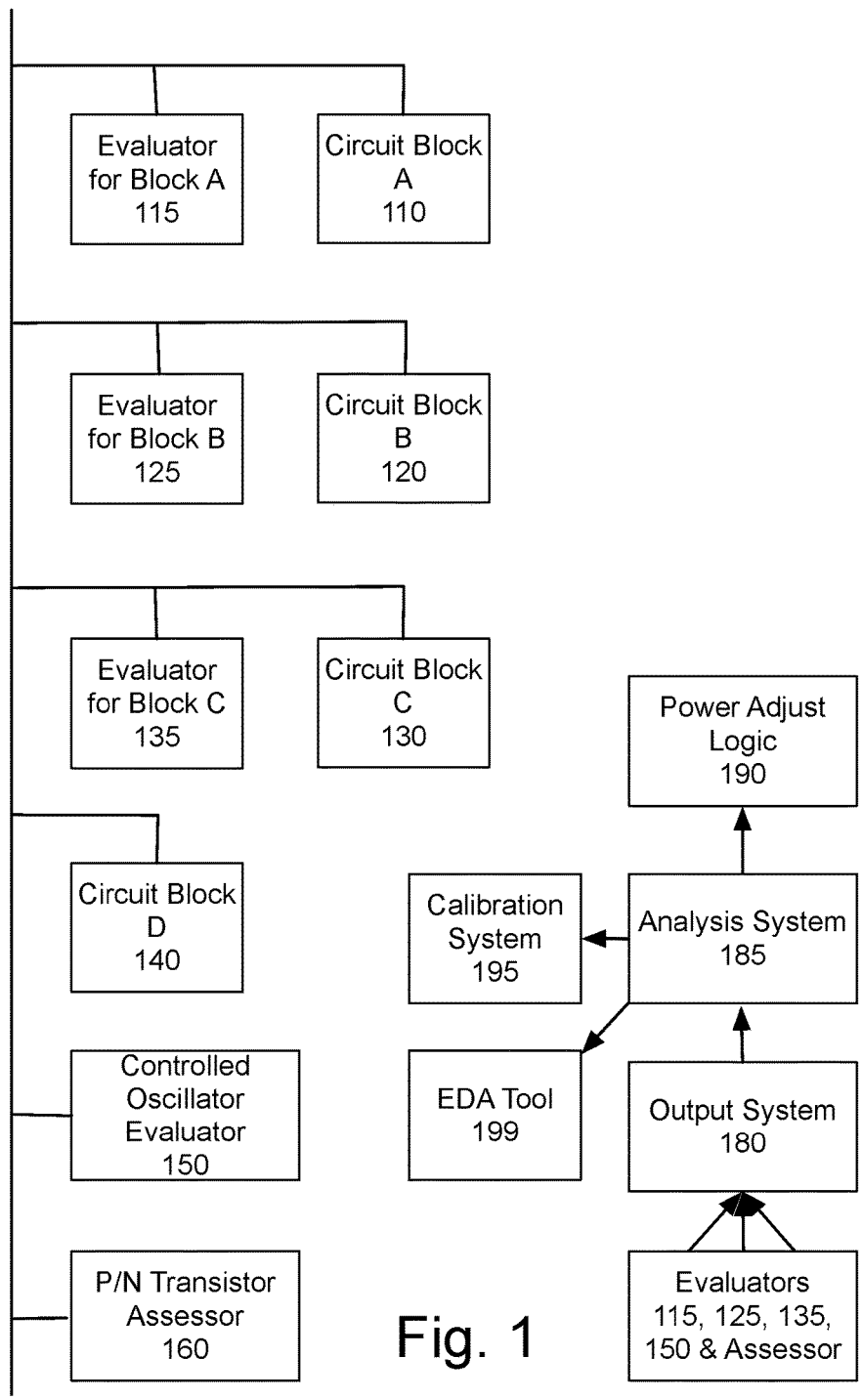
FIG. 1 is a block diagram of one embodiment of a circuit implementing the present system.

FIG. 1 is a block diagram of one embodiment of a circuit implementing the present system. Blocks 110, 120, 130, and 140 represent generic logic or memory blocks of random size, complexity, and placement in a particular chip driven by a power bus or mesh 170. Blocks may be selected to be groupings of similar circuit elements in relative proximity, or elements implementing a particular functionality, or elements connected to the same power source. The block may be created based on other aspects of the circuit. The selection, and sizing, of blocks is arbitrary, in one embodiment. Evaluation blocks 115, 125, and 135 are evaluation circuits positioned at the power connection point(s) of blocks 110, 120, and 130. Block 140 is a circuit block that is not evaluated. It may not be evaluated because it's fully characterized by its nature, because it's not on a critical path, or for another reason. In another embodiment, every block in the circuit may have an associated evaluator.

Controlled Oscillator evaluator 150 represents a controlled instance of the evaluation circuit coupled to power 170. In one embodiment, evaluator 150 and evaluators 115, 125, and 135 are identically configured. The controlled oscillator evaluator 150 is used to create a reference basis for the evaluators 115, 125, 135 associated with circuit blocks.

In one embodiment, controlled oscillator evaluator 150 includes two evaluation circuits. The controlled oscillator evaluator 150 utilizes a combination of a free running speed of a first evaluation circuit with zero resistance and a second evaluation circuit with a controlled resistance. This combination establishes a base leakage and dynamic power reference for the evaluator circuits used with the circuit blocks.

P/N Transistor assessor 160 is constructed from multi-instances of P-devices and N-devices in series aimed at establishing a statistically balanced measure of upper and lower leakage bounds for each of the P-devices and N-devices in the circuit. In one embodiment, the power to P/N transistor assessor 160 may be varied from zero to another voltage, to collect statistics of leakage at various voltage levels. The other voltage may be 10% over Vdd, 10% over the highest Vdd in the system, or another voltage level that is relevant to the circuit. This data may be used to estimate leakage per block based on an average gate count and the Vdd for that block.

P/N Transistor assessor 160 as well as circuit blocks 110, 120, and 130 are sample representatives of the elements of such an evaluation system. P/N Transistor assessor 160 could be repeated for a plurality of values of channel length of devices, or of threshold voltages or oxide thicknesses and is not limited to any one particular device size.

The output of evaluators 115, 125, 135, 150, and P/N transistor assessor 160 are output from the chip via output system 180. In one embodiment, output system 180 may buffer or temporarily store this data, prior to evaluating it for analysis. In one embodiment, output system 180 may be a pad on the chip, with a multiplexer to output the data from the plurality of evaluators 115, 125, 135, 150, and P/N Transistor assessor 160. In one embodiment, when evaluating a larger system, the elements shown in FIG. 1 may existing in multiple copies.

Analysis system 185 takes the data from evaluators, and P/N Transistor assessor 160, and Controlled oscillator evaluator 150. In one embodiment, the analysis system 185 comprises a computer system which is used to evaluate the circuit. Analysis system 185 in one embodiment determines the upper and lower leakage bounds for N-type and P-type transistors. It also determines each block's static and dynamic I*R drop. This data may be used by power adjust logic 190 to adjust the value of Vdd, clock speed, or other aspect of the system on a per block, per region, per sub-region, or whole chip level to account for the observed I*R drop.

This data may also be used by calibration system 195 to compare the actual observed static and dynamic I*R drop provided by this system to the estimates generated by various simulation systems. This data can then be used to tune the simulation systems, in one embodiment.

This data may also be provided by analysis system 185 to an electronic design automation (EDA) tool 199. The EDA tool 199 may utilize the characterization of the I*R drop provided by the analysis system 185 to provide an accurate evaluation of I*R drops in other circuits.

Figure 2:
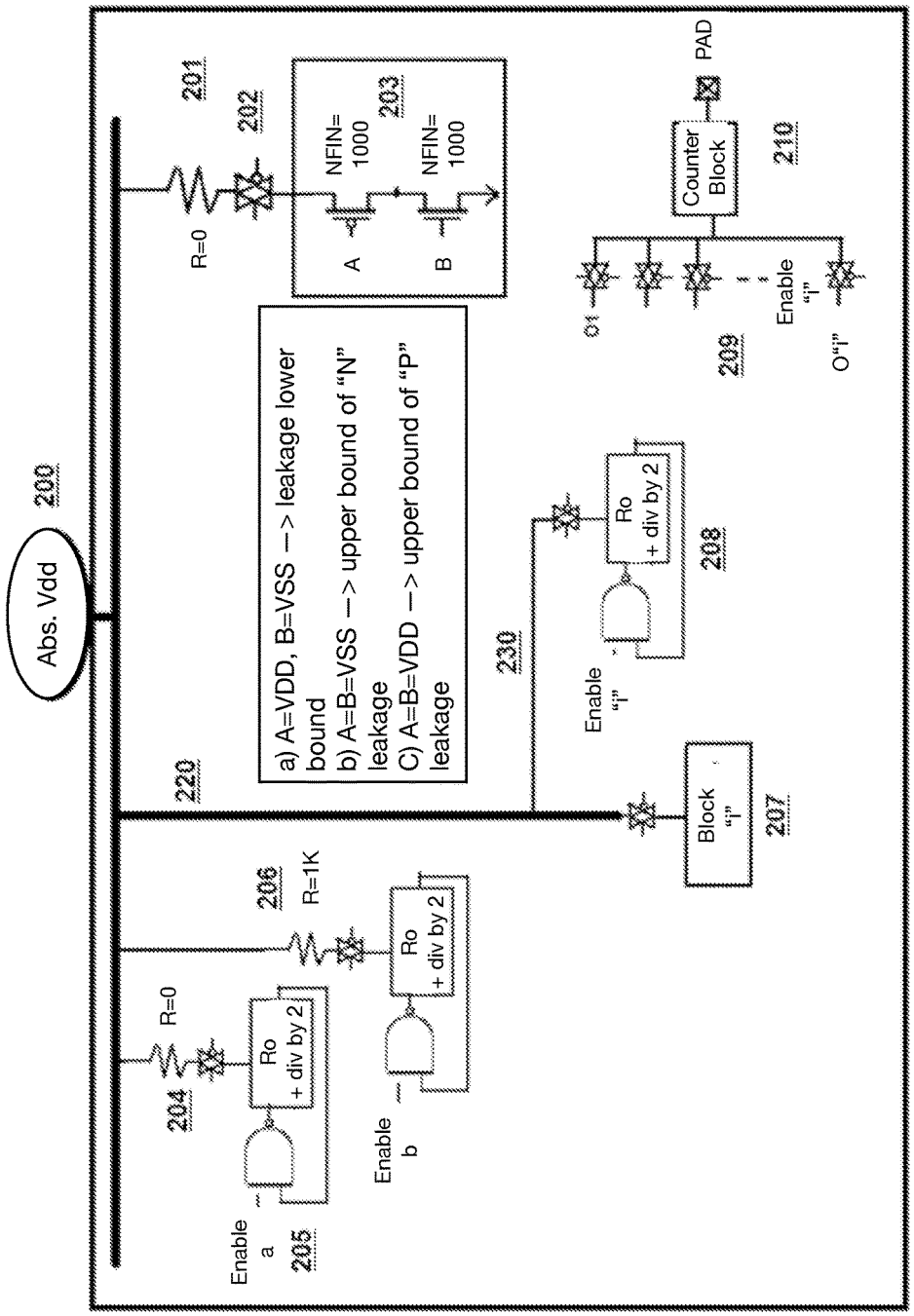
FIG. 2 is a circuit diagram of one embodiment of implementing the evaluation aspects of present system.

FIG. 2 is a circuit diagram of one embodiment of implementing the present system. Assessor 203 is a block intended to establish a measure of the leakage of P-devices and N-devices of the process used for the particular channel length, width, threshold voltage, oxide thickness, used in the circuit. In one embodiment, each of the P-device and N-device in block 203 is constructed from a large number of identical fingers or fins to average out any impact of local variability and to make the total measured current significant enough to be measured at the power supply by an automatic test system.

Assessor 203 is placed in proximity to the absolute power source and is routed to it through a wide enough metal segment to render the resistance of such a path effectively zero as indicated in 201. In one embodiment, the power to the transistors of assessor 203 is gated through a wide power gate 202, to minimize resistance. Given that the devices in 203 can be both turned off simultaneously, the power gate 202 is optional.

In one embodiment, a variety of configurations is tested. The table associated with assessor 203 indicates the status of the signal applied to each of the gates of the N and P transistors, A and B. With both A and B "off" the measured current through Vdd establishes a lower bound for the serial leakage of a P-device and N-device. With A "on" and B "off" the leakage for the N-device is established. Similarly with B "on" and A "off" the leakage of the P-device is established.

For this measurement to be most accurate, in one embodiment, power to the rest of the chip is off while power gate 202 is on. In one embodiment, this is accomplished with gates, associated with each block and evaluator, as shown.

In one embodiment, the basic evaluator circuit is an enabled ring oscillator 205. In one embodiment, an identical ring oscillator is used for evaluation in all blocks. The "enable" aspect of the ring oscillator allows for isolating the rest of the circuit during the evaluation, and thus for the evaluation of one block at a time. The "divide by 2" aspect is optional and is not particularly specific. It could be removed or replaced by a divide by "n" where "n" is any integer. To establish a reference of the free running frequency of this ring oscillator 205, connection to it is made through a very low resistance path 204 (practically zero) and an equally low resistivity power gate.

The same block is repeated but with a power path 206 of a known crafted resistance such as 1 KOhm to establish another data point of the running frequency of the un-loaded (not attached to a block) ring oscillator through a known resistance path. A gated (enabled) ring oscillator configured similarly to block 205 is used at the power connection point of the blocks for evaluation.

Elements 207, 208, 220, and 230 are a representation of a typical power path 220, 230 and block 207 to be evaluated. With the power gating to block "I" 207 off, the frequency of ring oscillator 208 reflects the effective supply voltage reaching block "I" 207 under leakage conditions only but through the resistive path of power 220. The resistance of path 230 should be very small (practically zero).

The power gating to block "I" 207 can be enabled and block "I" 207 toggled. Under that condition, the oscillation frequency of the ring oscillator 208 will reflect the effective voltage at block "I" 207 through the resistive power path and the dynamic switching condition.

This can be evaluated for as many blocks and as many voltage domains as desired. Although only a single block and evaluator is shown in this figure for simplicity, it should be understood that a typical configuration would have multiple blocks evaluated.

Block 209 reflects the optional choice of multiplexing the outputs of various ring oscillators from any block and/or from the reference oscillator to a single circuit output Pad to save on the total number of pins required.

Counter block 210 is a simplified representation of a counter with a start and a stop that can count the output transition rate of any multiplexed ring oscillator output. The counter provides a measure of the speed of the ring oscillator captured digitally. The stored number in the counter, for any block is compared to the absolute reference generated from ring oscillator 204 to reflect the corresponding voltage reduction due to I*R drop reaching any particular block under static or dynamic conditions.

Figure 3:
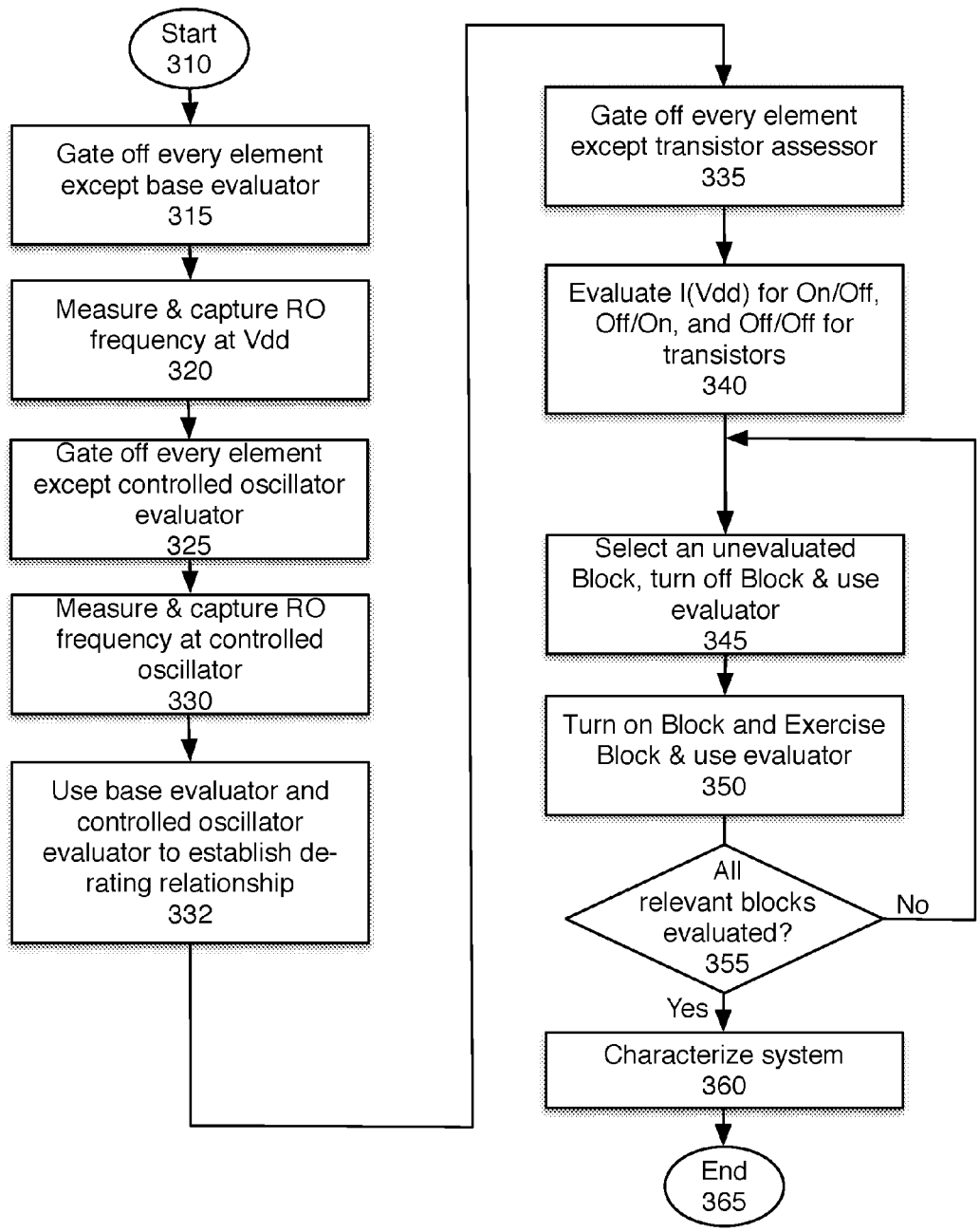
FIG. 3 is a flowchart of one embodiment of implementing the present system.

FIG. 3 is a flowchart of one embodiment of implementing the present system. Blocks 315 and 320 establish a reference speed for a ring oscillator powered directly through the power source, using a base evaluator. In one embodiment, this is done with all other blocks in the circuit turned off. This may be done with gates, as shown in FIG. 2. The fact that this reference evaluator is directly powered by the absolute power source does not necessitate that all else is turned off, but, but turning off other elements provides more accurate data. Therefore, in one embodiment that is preferred.

An identical replica of this evaluator will be used at the power connection for all blocks to be evaluated, in one embodiment. In another embodiment, there may be multiple configurations of evaluators. In such an embodiment, in one embodiment, each evaluator would have an associated base evaluator.

Blocks 325 and 330 are identical to blocks 315 and 320 with one major difference in that the ring oscillator in 325 is powered through a known resistor. In one embodiment, the resistor is crafted carefully to be insensitive to process variation. This is done to establish a de-rating relationship (curve), at block 332, between applied voltage and oscillation speed. Block 325 can be replicated with multiple resistance values to establish a more accurate de-rating curve.

Blocks 335 and 340 refer to a unique block in the flow specifically focused at measuring leakage of stacked N-devices and P-devices. Since the measurement entails measuring tiny currents flowing through a power source a dedicated power pin is used in one embodiment for this block. However, it is not absolutely necessary. In one embodiment, other sources of leakage current may be shut off by other means during the evaluation of this process.

The loop established in blocks 345, 350 describes the steps needed to evaluate the effective voltage at the power supply point for every block being evaluated. This can be done in a serial fashion, as shown in the flowchart, to establish absolute accuracy. This loop can be done with the block under evaluation turned off first, at block 345, and then with the block turned on and functionally exercised with the proper set of functionality vectors reflecting typical operation, at block 350. In one embodiment, the blocks evaluated may alternatively or additionally be exercised concurrently to establish the effect of any power mesh interaction if various blocks share common segments of power trunks.

At block 360 the results of the test are used to characterize the system. The results are used to establish an accurate value of the effective resistance between the absolute power source and each power connectivity point for each block under evaluation. If not all relevant blocks have been evaluated, the process returns to block 345, to select the next unevaluated block. In one embodiment, if multiple types of evaluations are done (e.g. gated and concurrently exercised) a similar loop may be made for each type of evaluation.

Once the blocks have all been evaluated, this data is output via a pad, in one embodiment. This data is used to characterize the system, at block 360. The process then ends at block 365.

Figure 4:
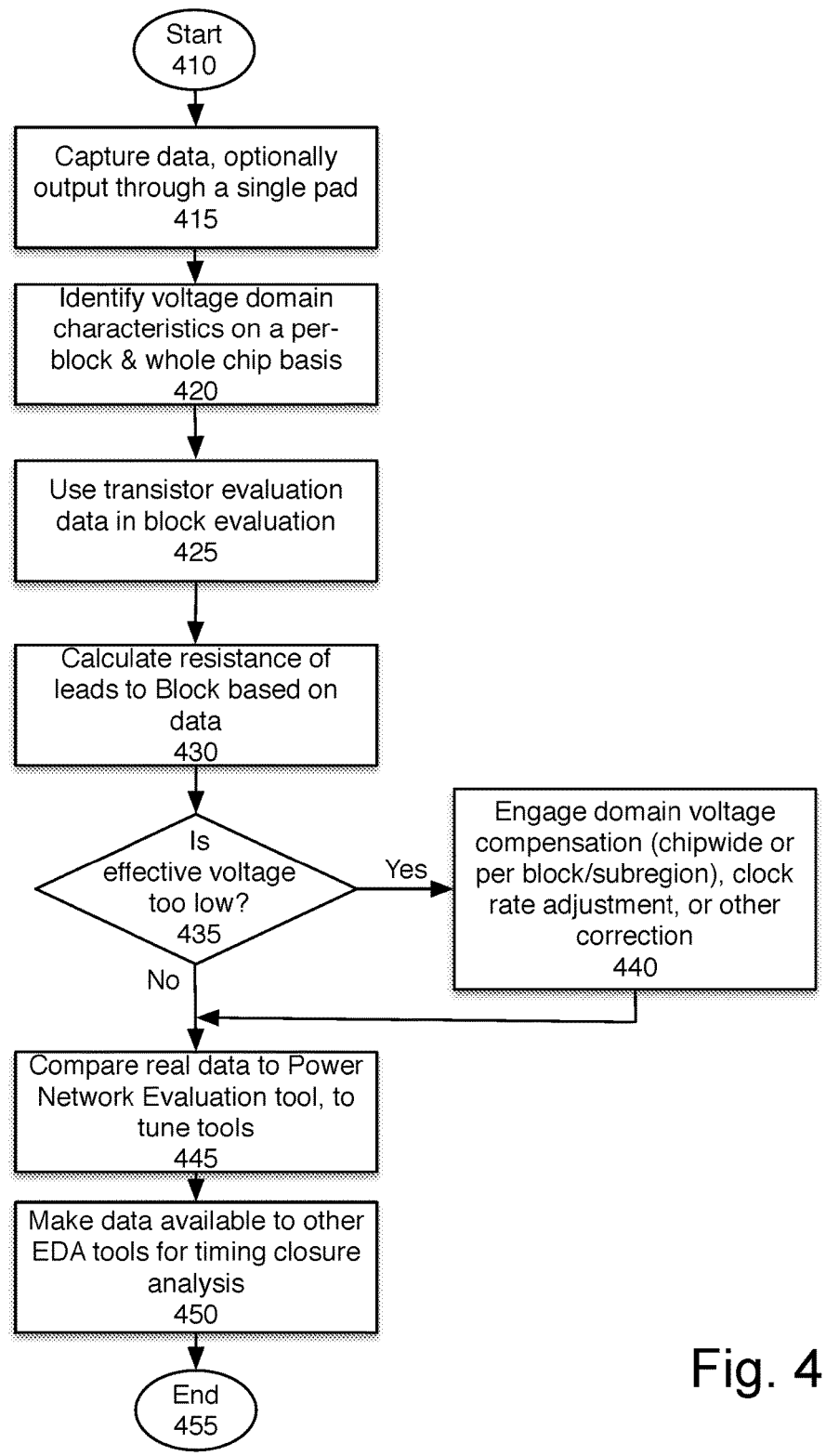
FIG. 4 is a flowchart of one embodiment of utilizing the testing data.

FIG. 4 is a flowchart of one embodiment of utilizing the testing data to characterize the circuit. In one embodiment, this flowchart corresponds to block 360 of FIG. 3. In one embodiment, at block 415 the outputs from the ring oscillators used for various blocks are captured. In one embodiment, the outputs are multiplexed and then output to a counter. In one embodiment, the counter is serially read at one pin. Alternative methods of capturing the ring oscillator (or other evaluator) output may be used.

At block 420 all the collected data plus the de-rating curves generated are used to establish a voltage domain map of the whole chip.

At block 425, the data from the transistor assessor is used in block evaluation. This is used to even out statistical distribution, and gives a lower bound of average leakage (when both P and N are off, their R is in series), and an upper bound of each type when is series with the "off" state of the other. By varying VDD from zero to Vdd nominal +10% (or any desired variance) the system can sweep and collect statistics of leakage. This information can be used to estimate the leakage per block based on average gate count, and, the assigned VDD for that block.

At block 430 the collected data and the de-rating curve is used to establish a power network effective resistance map.

The decision loop blocks 435 and 440 refers to the use of the voltage domain map of the chip for static or dynamic tuning of the voltage domains in a variety of techniques. In one embodiment, the tuning may include simply increasing the absolute power supply to partially or fully compensate for the voltage drop across the power network, to locally compensate for certain blocks. Such increases may be a per block, per subregion, or chipwide basis. In one embodiment, the adjustment may be a clock frequency adjustment. Other techniques may also be used.

At block 445 the collected data is used to calibrate an EDA tool such as PrimeRail, in one embodiment. In one embodiment, the real data gathered by this system may be compared to the systematic estimation done by EDA tools, and this may be used to calibrate. In one embodiment, the leakage data collected in the dedicated leakage block can be used by many tools to help estimate the overall leakage of various block under random power-up conditions through the established statistically aware leakage bounds Block 450 emphasizes the importance of the collected data in fine tuning and in enhancing various EDA tools involved in the design and verification of chips such as PrimeTime and other tools. The process then ends at block 455.

Of course, though FIGS. 3 and 4 are shown as flowcharts, the values processes need not be executed in order, unless the blocks show a dependency. For example, blocks may be evaluated in parallel, or disjointly, and the transistor evaluation may occur at a different time, rather than in the order shown in the figures. Similarly, the resultant adjustments are generally independent, and one or more of them may occur, in any logical order.

The analysis system, and calibration system as well as power adjust logics and other analytics run on a computer system or processor. In one embodiment, the algorithms are implemented in software, such as C/C++, Go, Java, and Python. This problem, and thus this solution, is inherently linked to circuit design technology.

Figure 5:
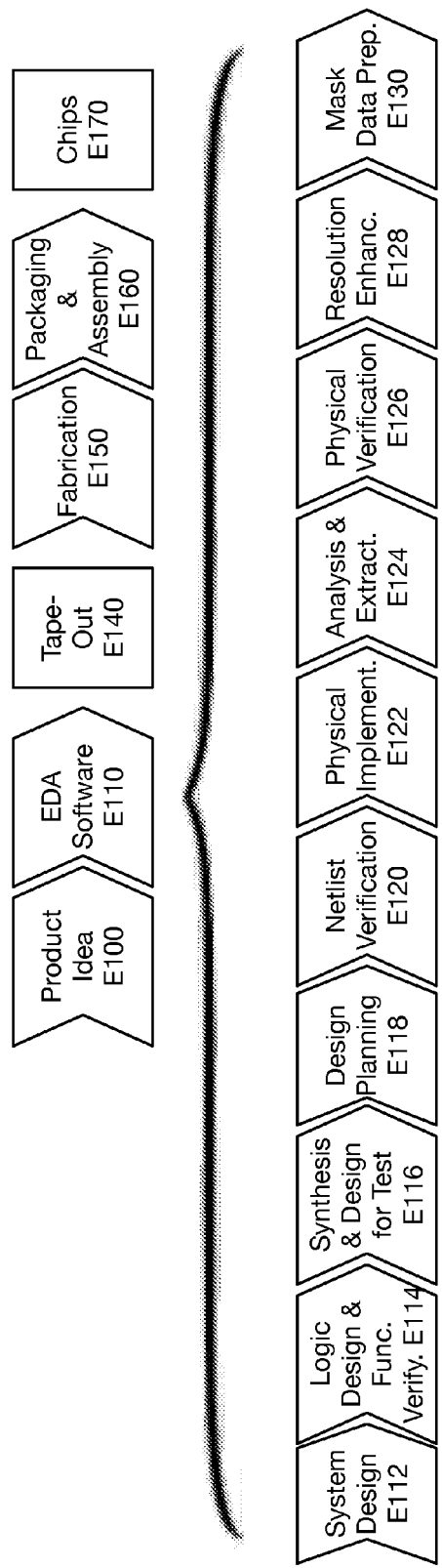
FIG. 5 is an exemplary electronic design automation (EDA) flow.

In one embodiment, the analysis system 185 and power adjust logic 185, as well as calibration system 195 are embedded in one or more electronic design automation (EDA) tools and used to calibrate, and adjust circuit designs, and circuit blocks. An EDA flow can include multiple steps, and each step can involve using one or more EDA software tools. Some EDA steps and software tools are described below, with respect to FIG. 5. These examples of EDA steps and software tools are for illustrative purposes only and are not intended to limit the embodiments to the forms disclosed.

To illustrate the EDA flow, consider an EDA system that receives one or more high level behavioral descriptions of an IC device (e.g., in HDL languages like VHDL, Verilog, etc.) and translates ("synthesizes") this high level design language description into netlists of various levels of abstraction. A netlist describes the IC design and is composed of nodes (functional elements) and edges, e.g., connections between nodes. At a higher level of abstraction, a generic netlist is typically produced based on technology independent primitives.

The generic netlist can be translated into a lower level technology-specific netlist based on a technology-specific (characterized) cell library that has gate-specific models for each cell (functional element). The models define performance parameters for the cells; e.g., parameters related to the operational behavior of the cells, such as power consumption, delay, transition time, and noise. The netlist and cell library are typically stored in computer readable media within the EDA system and are processed and verified using many well-known techniques.

Before proceeding further with the description, it may be helpful to place these processes in context. FIG. 4 shows a simplified representation of an exemplary digital ASIC design flow. At a high level, the process starts with the product idea (step E100) and is realized in an EDA software design process (step E110). When the design is finalized, it can be taped-out (event E140). After tape out, the fabrication process (step E150) and packaging and assembly processes (step E160) occur resulting, ultimately, in finished chips (result E170).

The EDA software design process (step E110) is actually composed of a number of steps E112-E130, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step E110) will now be provided:

System design (step E112): The designers describe the functionality that they want to implement and can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step E114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step E116): Here, the VHDL/Verilog is translated into a netlist. The netlist can be optimized for the target technology. Additionally, the design and implementation of tests to permit checking of the finished chip occurs. Exemplary EDA software products from Synopsys, Inc. that can be used at this step include Design Compiler®, Physical Compiler, Test Compiler, Power Compiler, FPGA Compiler, Tetramax, and DesignWare® products.

Design planning (step E118): Here, an overall floorplan for the chip is constructed and analyzed for timing and top-level routing. Exemplary EDA software products from Synopsys, Inc. that can be used at this step include Jupiter and Floorplan Compiler products.

Netlist verification (step E120): At this step, the netlist is checked for compliance with timing constraints and for correspondence with the VHDL/Verilog source code. Exemplary EDA software products from Synopsys, Inc. that can be used at this step include VCS, VERA, Formality and PrimeTime products.

Physical implementation (step E122): The placement (positioning of circuit elements) and routing (connection of the same) occurs at this step. Exemplary EDA software products from Synopsys, Inc. that can be used at this step include the Astro product.

Analysis and extraction (step E124): At this step, the circuit function is verified at a transistor level, this in turn permits what-if refinement. Exemplary EDA software products from Synopsys, Inc. that can be used at this step include Star RC/XT, Raphael, and Aurora products.

Physical verification (step E126): At this step various checking functions are performed to ensure correctness for: manufacturing, electrical issues, lithographic issues, and circuitry. Exemplary EDA software products, Inc. that can be used at this step include the Hercules product.

Resolution enhancement (step E128): This step involves geometric manipulations of the layout to improve manufacturability of the design. Exemplary EDA software products from Synopsys, Inc. that can be used at this step include iN-Phase, Proteus, and AFGen products.

Mask data preparation (step E130): This step provides the "tape-out" data for production of masks for lithographic use to produce finished chips. Exemplary EDA software products from Synopsys, Inc. that can be used at this step include the CATS® family of products.

With respect to this application, the circuit blocks and associated evaluators and output system may be implemented in a chip, built via an EDA system. Such chips may be test circuits initially fabricated for testing, prior to making circuits in larger volumes.

In one embodiment, the power adjust logic 190 may be implemented in a subsequent physical implementation step. The calibration system 195 may be implemented in the design planning step, and other steps, to utilize the observed data regarding the circuit blocks in future circuit designs. And the EDA system receiving the data from the analysis logic would utilize the I*R characterization in subsequent synthesis, design, and tests, and other steps.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. An apparatus of evaluating effective voltage in a circuit comprising:
   a circuit block coupled to Vdd;
   an evaluator coupled to a voltage input of the circuit block, to evaluate static and dynamic I*R drop for the circuit block; and
   a controlled oscillator evaluator designed to provide a reference basis for the evaluator, the controlled oscillator evaluator comprising two evaluators, a first evaluator coupled through a near zero resistance line and a second evaluator coupled through a calibrated resistance line, to establish a de-rating relationship between an applied voltage and output of the controlled oscillator evaluator.

2. The apparatus of claim 1, wherein the evaluator comprises a ring oscillator.

3. The apparatus of claim 1, further comprising:
a power gate to block off other elements of the circuit when evaluating the circuit block; and
the evaluator to test the effective voltage when the circuit block is idle, and when the circuit block is active.

4. The apparatus of claim 1, further comprising:
the controlled oscillator evaluator coupled to the Vdd, the controlled oscillator evaluator matching the evaluator, and designed to provide a reference basis for the evaluator.

5. The apparatus of claim 1, wherein the evaluator is a ring oscillator and the output of the ring oscillator is an oscillation speed, based on the effective voltage.

6. The apparatus of claim 1, further comprising:
a P/N transistor assessor to establish a statistically balanced measure of upper and lower leakage bounds for each of the P-devices and N-devices in the circuit.

7. The apparatus of claim 6, wherein the P/N transistor assessor tests with a P-transistor and an N-transistor in an On/On, On/Off, and Off/On configuration.

8. The apparatus of claim 1, further comprising:
an output system to multiplex outputs of a plurality of evaluators, evaluating a plurality of blocks, to a single output pad on the circuit.

9. The apparatus of claim 8, further comprising:
a counter with a start and a stop to count an output transition rate of an multiplexed ring oscillator output of the plurality of evaluators, the counter to measure a speed of the ring oscillator; and
an analysis system to compare an output transition rate to an absolute reference to determine a voltage reduction due to an I*R drop reaching the block under static and/or dynamic conditions.

10. The apparatus of claim 1, further comprising:
a power adjust logic to adjust the circuit based on the static and dynamic I*R drop, the adjustment comprising one of: adjusting Vdd for the block, adjusting Vdd for the circuit, adjusting clock frequency for the block, or adjusting clock frequency for the circuit.

11. A method of evaluating a circuit comprising:
defining a circuit block coupled to Vdd;
evaluating static and dynamic I*R drop for the circuit block with an evaluator; and
establishing a de-rating relationship between an applied voltage and output of the controlled oscillator evaluator, by utilizing two evaluators, a first evaluator coupled through a near zero resistance line and a second evaluator coupled through a calibrated resistance line.

12. The method of claim 11, wherein the evaluator comprises a ring oscillator.

13. The method of claim 11, further comprising:
blocking off other elements of the circuit when evaluating the circuit block; and
testing the effective voltage when the block is idle, and when the block is active.

14. The method of claim 11, further comprising:
creating a reference basis for the evaluator of the circuit block using a controlled oscillator evaluator coupled to a power source, wherein the controlled oscillator evaluator matches the evaluator of the circuit block.

15. The method of claim 11, wherein the evaluator is a ring oscillator and the output of the ring oscillator is an oscillation speed, based on the effective voltage.

16. The method of claim 11, further comprising:
establishing a statistically balanced measure of upper and lower leakage bounds for each of the P-devices and N-devices in the circuit utilizing a P/N transistor assessor.

17. The method of claim 11, further comprising:
multiplexing outputs of a plurality of evaluators evaluating a plurality of blocks, enabling the use of a single output pad on the circuit.

18. The method of claim 11, further comprising:
adjusting the circuit based on the static and dynamic I*R drop of one or more circuit blocks evaluated, the adjustment comprising one of: increasing Vdd for the block, increasing Vdd for the circuit, adjusting clock frequency for the block, or adjusting clock frequency for the circuit.

19. A circuit evaluator comprising:
a P/N transistor assessor to establish a statistically balanced measure of upper and lower leakage bounds for each of the P-devices and N-devices in the circuit, wherein the P/N transistor assessor tests with a P-transistor and an N-transistor in an On/On, On/Off, and Off/On configuration;
a controlled oscillator evaluator coupled to the Vdd, the controlled oscillator evaluator to provide a reference basis for the evaluator;
a circuit block coupled to Vdd;
an evaluator coupled to a voltage input of the circuit block, to evaluate static and dynamic I*R drop for the circuit block, the evaluator matched to the controlled oscillator evaluator.

20. The circuit evaluator of claim 19 further comprising:
an analysis system to provide a characterization of I*R drops at the circuit block to an EDA tool.

21. The circuit evaluator of claim 19, wherein the evaluator is a ring oscillator and the output of the ring oscillator is an oscillation speed, based on the effective voltage.

22. The circuit evaluator of claim 19, further comprising:
a power gate to block off other elements of the circuit when evaluating the circuit block; and
the evaluator to test the effective voltage when the circuit block is idle, and when the circuit block is active.

* * * * *